United States Patent [19]

Heier et al.

[11] Patent Number: 4,588,311

[45] Date of Patent: May 13, 1986

[54] BEARING ASSEMBLY FOR OSCILLATING ANGULAR MOVEMENT

[75] Inventors: Dieter Heier, Gelsenkirchen; Wilfried Gille, Dorsten, both of Fed. Rep. of Germany

[73] Assignee: Gelenkwellenbau GmbH, Essen, Fed. Rep. of Germany

[21] Appl. No.: 784,840

[22] Filed: Oct. 4, 1985

[30] Foreign Application Priority Data

Oct. 27, 1984 [DE] Fed. Rep. of Germany ....... 3439385

[51] Int. Cl.[4] .............................................. F16C 19/00
[52] U.S. Cl. ..................................... 384/456; 384/551; 384/565
[58] Field of Search ............... 384/456, 551, 548, 553, 384/565

[56] References Cited

U.S. PATENT DOCUMENTS

| | | | |
|---|---|---|---|
| 238,579 | 3/1881 | Ellis | 384/551 |
| 3,022,875 | 2/1962 | Davis | 192/45.1 |
| 3,351,398 | 11/1967 | Park et al. | 384/456 |

FOREIGN PATENT DOCUMENTS 2084671  4/1982  United Kingdom ............... 384/551

*Primary Examiner*—Lenard A. Footland
*Attorney, Agent, or Firm*—Toren, McGeady, Stanger, Goldberg & Kiel

[57] ABSTRACT

A bearing for oscillating angular movement including inner and outer bearing parts with rollers therebetween, and with one or more swivel members between at least some of the adjacent rollers. Each swivel member comprises a central part of smaller diameter than a roller, and inwardly and outwardly extending portions having supporting faces which engage the inner and outer bearing parts. Because each swivel member occupies a smaller space circumferentially of the bearing than does an individual roller, the total number of members available to transmit loads between the inner and outer bearing parts is increased, thereby improving the capacity of the bearing. The bearings are particularly useful for Hookes universal joints.

2 Claims, 6 Drawing Figures

BEARING ASSEMBLY FOR OSCILLATING ANGULAR MOVEMENT

The present invention relates generally to bearing assemblies and more particularly to a bearing for oscillating angular movement. Bearings according to the invention are useful for Hookes universal joints.

It is known from U.S. Pat. No. 3,022,875 that in a rotary bearing comprising inner and outer annular bearing parts and roller members therebetween, sprag members can be interposed between the roller members so that the bearing acts as a one-way clutch or freewheeling unit. However, because of the introduction of the sprag members, the capacity of the bearing is reduced.

It is the object of the present invention to provide a bearing suitable for oscillating angular movement, wherein the load bearing capacity and/or service life is increased in comparison with conventional designs of bearing assemblies.

SUMMARY OF THE INVENTION

According to the invention, there is provided a bearing assembly for oscillating angular movement, comprising inner and outer annular bearing parts and a plurality of roller members disposed therebetween, wherein, between each of at least some adjacent pairs of said roller members, there is disposed a swivel member occupying a smaller space circumferentially of the bearing than individual roller members, each said swivel member comprising a substantially cylindrical central part of smaller diameter than a roller member, and radially inwardly and outwardly extending portions having supporting faces engaging said inner and outer bearing parts, said faces having a curvature which corresponds to that of the roller members, with side faces of at least the radially inwardly extending portion being shaped to interfit with the roller members.

In a bearing assembly according to the invention, the use of the swivel members which individually occupy less space circumferentially of the bearing that does a roller member, means that there are more members through which loads are transmitted between the inner and outer bearing parts. The capacity of the bearing is thus increased. Of course, the bearing is only effective over a range of angular movement determined by the limit of possible tilting or swivelling movement of the swivel members, but within such range, the invention represents a useful increase in bearing capacity, e.g., possibly 30%.

Because of production tolerances in the manufacture of swivel members, whose shape is relatively complex, there may be a tendency for the swivel members to become skewed in the bearing. However, because they are disposed between roller members, the swivel members are kept in the correct alignment.

It is possible for two or more of said swivel members to be disposed between at least some of said pairs of roller members. This means that bearing capacity can be increased further. The number of swivel members able to be inserted between two roller members is limited by cumulative tolerances in the bearing and the ability of the roller members to hold the swivel members in correct alignment.

Bearings according to the invention are advantageously utilized in Hookes universal joints between the yokes of the joints and the arms of the joint cross member. It will be appreciated that when a Hookes joint is operating in the articulated condition, such bearings undergo an oscillating angular movement.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
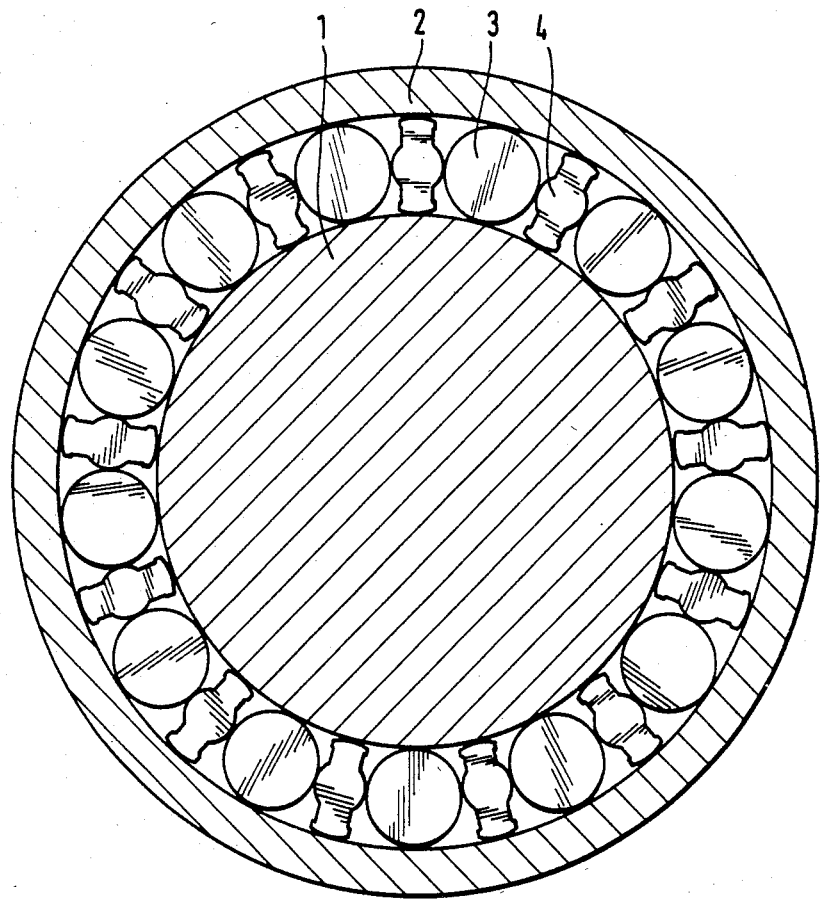
FIG. 1 is a section through a bearing according to the invention.

Referring firstly to FIG. 1, a bearing according to the invention comprises an inner part 1 having an outwardly facing annular bearing surface, and an annular outer part 2 having an inwardly facing bearing surface. A plurality of roller members 3 and swivel members 4, alternately, are disposed between the bearing parts 1, 2.

Figure 2:
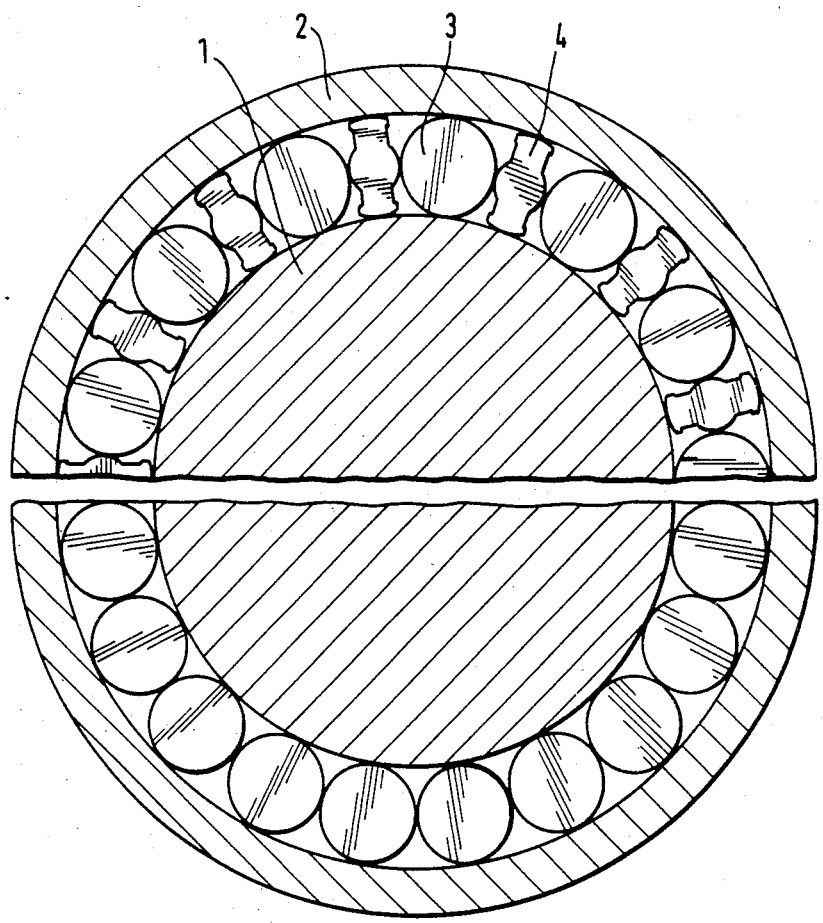
FIG. 2 is a section of the upper half which is taken through a bearing according to the invention and the lower half of which is through a conventional bearing.
Figure 3:
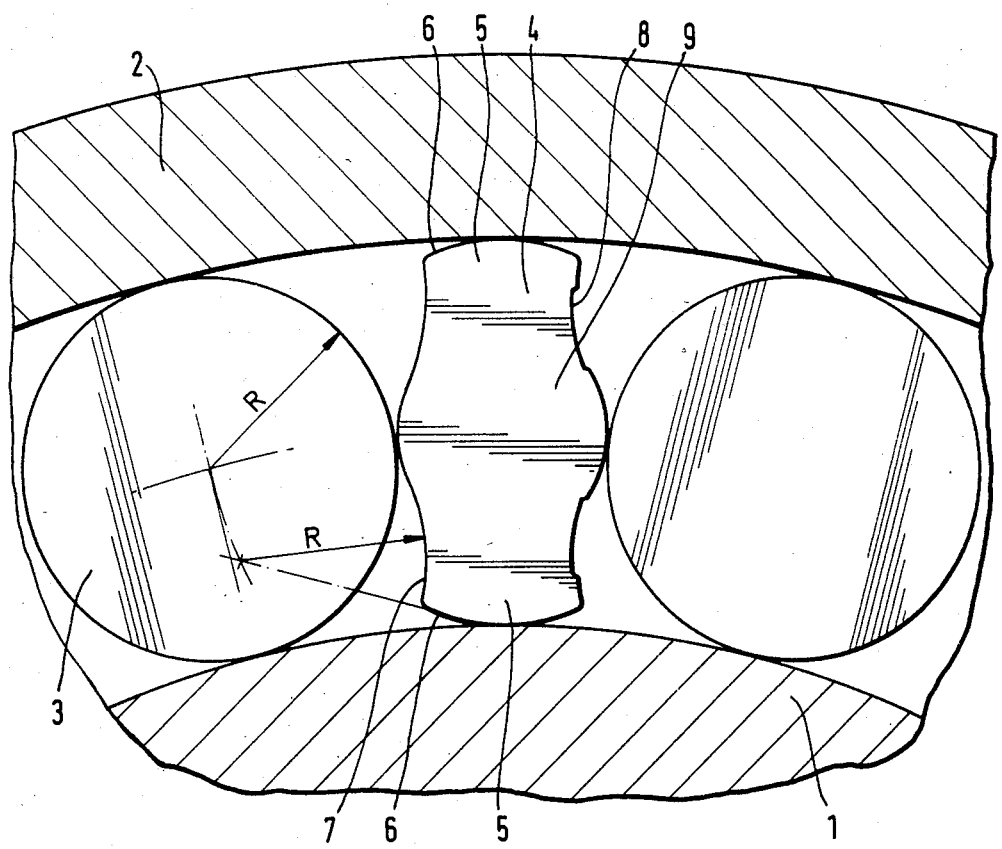
FIG. 3 is an enlarged section of the bearing of FIG. 1.

Referring now to FIG. 2, the upper half thereof clearly illustrates that in a bearing according to the invention, because each swivel member 4 occupies a smaller space circumferentially of the bearing than does a roller member 3, the total number of members able to transmit loads between the bearing parts is increased in comparison with a conventional bearing having rollers only, as is shown in the lower half of FIG. 3. Indeed, there is an increase of approximately 30% in the number of load carrying members. This may approximately double the service life of the bearing. Depending on the angle of movement required in the bearing, it may be possible to accommodate even more swivel members.

Referring now to FIG. 3 of the drawings, a swivel member 4 is shown in greater detail, disposed between two roller members 3 between the inner and outer bearing parts 1, 2. The swivel member comprises a cylindrical central portion 9 whose diameter is less than the diameter of a roller 3. The swivel member further comprises radially inwardly and outwardly extending portions 5 terminating in supporting faces 6 which engage the inner and outer bearing parts 1, 2. The radius of curvature of the supporting faces 6 is substantially equal to the radius R of the roller members. The side face 7 of the inwardly extending portion 5 of the swivel member is a curved face of radius R equal to the roller radius, so that it interfits with the roller member when the swivel member is tilted as described hereafter.

As an alternative to a curved contact face 7, the side face of the portion 5 of the swivel member may be grooved or undercut, as shown at 8, which is advantageous in that only the residual face which contacts the roller when the swivel member is tilted needs to be accurately produced.

In the illustrated embodiment, both the inwardly and outwardly extending portions 5 of the swivel member are formed with faces 7 or 8 to engage the rollers. This is a production advantage in that incorrect insertion of the swivel member into the bearing is impossible. However, only the inwardly extending portion 5 need be shaped to make contact with the rollers. It would be possible for the outwardly extending projection 5 to have a wider outer supporting face 6.

Figure 4:
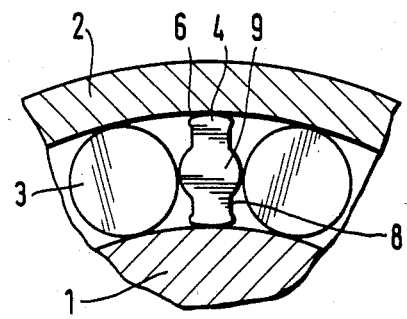
FIGS. 4, 5 and 6 are three sections showing operative conditions in a bearing according to the invention.
Figure 5:
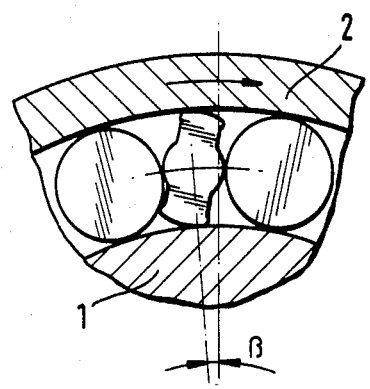
Figure 6:
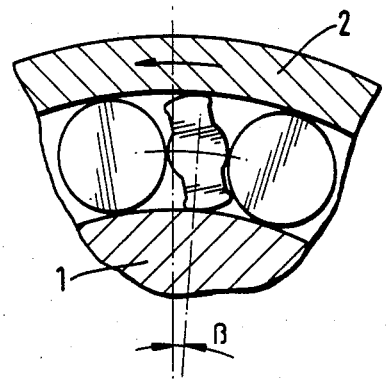

In FIG. 4, a swivel member 4 is shown in its intermediate position. FIG. 5 shows the attitude it adopts when the bearing has undergone an angular movement through an angle $\beta$ in one sense, with the swivel member swivelled or tilted until the side face of its inwardly extending portion 5 has contacted the roller to the left thereof. FIG. 6 shows the bearing when it has undergone an angular movement through angle $\beta$ in the opposite sense from the intermediate position, wherein the opposite side face of the inwardly extending portion 5 of the swivel member has contacted the opposite roller. The total possible angle through which the bearing can be displaced is thus $2\beta$.

A bearing according to the invention is particularly useful in Hookes universal joints. The angular displacement $\beta$ corresponds to the articulation angle of the joint.

While a specific embodiment of the invention has been shown and described in detail to illustrate the application of the inventive principles, it will be understood that the invention may be embodied otherwise without departing from such principles.

What is claimed is:

1. A bearing assembly for oscillating angular movement comprising:
   an inner and an outer annular bearing part;
   a plurality of roller members disposed between said inner and outer bearing parts; and
   a plurality of swivel members interposed between at least some of adjacent ones of said roller members, said swivel members each occupying a smaller space circumferentially of the bearing than said individual roller members;
   each of said swivel members comprising
   a substantially cylindrical central part of smaller diameter than a roller member,
   radially inwardly and outwardly extending portions having supporting faces engaging said inner and outer bearing parts, said supporting faces having a curvature which corresponds to that of said roller members, and
   side faces formed at least on said radially inwardly extending portions of said swivel members, said side faces being shaped to interfit with said roller members.

2. An assembly according to claim 1, wherein two or more of said swivel members are disposed between at least some of said pairs of roller members.

* * * * *